United States Patent [19]

Matsukawa et al.

[11] 3,955,025

[45] May 4, 1976

[54] PRESSURE-SENSITIVE COPYING SHEET

[75] Inventors: Hiroharu Matsukawa; Keiso Saeki, both of Fujimiya, Japan

[73] Assignee: Fuji Photo Film Co., Ltd., Minami-ashigara, Japan

[22] Filed: Oct. 2, 1974

[21] Appl. No.: 511,330

[30] Foreign Application Priority Data

Oct. 2, 1973 Japan .............................. 48-110702

[52] U.S. Cl. ................................ 428/212; 282/27.5; 427/152; 427/153; 428/213; 428/219; 428/306; 428/307; 428/342; 428/323; 428/327; 428/407; 428/537

[51] Int. Cl.$^{2}$ ......................... B32B 7/00; B41L 1/36; B32B 5/16

[58] Field of Search ............... 161/165, 168, DIG. 5; 117/36.2, 36.4, 36.8, 36.9; 282/28 R, 27.5; 428/913, 212, 213, 407, 327, 323, 219, 537, 342, 306, 307; 427/152, 153

[56] References Cited

UNITED STATES PATENTS

| | | | |
|---|---|---|---|
| 2,655,453 | 10/1953 | Sandberg | 428/307 |
| 2,711,375 | 6/1955 | Sandberg | 117/36.2 |
| 2,907,682 | 10/1959 | Eichel | 161/162 |
| 3,287,154 | 11/1966 | Haas | 117/36.9 |
| 3,427,180 | 2/1969 | Phillips | 117/36.2 |
| 3,432,327 | 3/1969 | Kan | 117/36.2 |
| 3,576,660 | 4/1971 | Bayless | 117/36.8 |
| 3,592,677 | 7/1971 | Tsuboi | 117/36.9 |
| 3,617,334 | 11/1971 | Brockett | 428/307 |
| 3,697,323 | 10/1972 | Brown | 428/307 |
| 3,732,119 | 5/1973 | Churchill | 117/36.7 |
| 3,738,857 | 6/1973 | Brockett | 428/307 |
| 3,825,467 | 7/1974 | Phillips | 428/307 |
| 3,836,382 | 9/1974 | Garner | 117/36.8 |
| 3,867,169 | 2/1975 | Shinizu | 428/307 |

*Primary Examiner*—William J. Van Balen
*Assistant Examiner*—Ellis P. Robinson
*Attorney, Agent, or Firm*—Sughrue, Rothwell, Mion, Zinn & Macpeak

[57] ABSTRACT

A pressure-sensitive recording sheet which comprises a support having thereon a color former-containing microcapsule coating, the microcapsule coating comprising at least two microcapsule layers with the mean particle size of the microcapsules in the microcapsule layer closest to the support being larger than the mean particle size of the microcapsules in the microcapsule layer farther away from the support.

7 Claims, No Drawings

PRESSURE-SENSITIVE COPYING SHEET

BACKGROUND OF THE INVENTION

1. Field of the Invention

The present invention relates to a pressure-sensitive copying sheet and, more particularly, it relates to a pressuresensitive copying sheet having an improved color former layer.

2. Description of the Prior Art

Recording sheets of the type which undergo a change in color from a colorless state to a colored state by pressure have long been known as a pressure-sensitive copying paper (e.g., as disclosed in U.S. Pat. Nos. 2,711,375; 2,712,507; 2,730,456; 2,730,457; 3,418,250; 3,432,327; etc.).

With these pressure-sensitive papers, the higher the density of the recorded images obtained by applying pressure, the more preferable is the paper. However, in using these pressure-sensitive copying papers for out-put recording of a computer, colored images having a sufficiently high density cannot be obtained. Because, the impact pressure of a key for out-put recording is so low (less than about 200 kg/cm$^2$ on the average) thus the density of the recorded images is reduced. This low pressure is particularly conspicuous in the case of making a number of copies.

In general, for increasing the color density, it is known (1) to increase the color former concentration in the capsules; (2) to make the particle size of the microcapsules large to increase rupture efficiency; (3) to increase the amount of microcapsules coated; (4) to enhance the color-developing ability of a color developer; and the like.

However, since almost all color formers possess low solubility, increasing the color former concentration fails to sufficiently attain the objects. When the microcapsule particle size is increased, coloration disadvantageously occurs upon winding the paper up in production and in the processing steps, on cutting the paper or upon the accidental application of pressure (formation of smudges), leading to another defect. Also, increasing the amount of microcapsules coated decreases the flexibility of the coated paper. For these reasons, it is industrially difficult to increase the color density using the above-described approaches.

In addition, it has heretofore been suggested, to use a solid granular substance and/or a binder to prevent the accidental destruction of microcapsules. However, these substances reduce the coating ability, deteriorate the surface property of the coated surface, reduce the efficiency of rupturing the microcapsules and copying ability, and the like.

SUMMARY OF THE INVENTION

It is therefore an object of the present invention to provide a pressure-sensitive copying sheet which provides enhanced color density.

Another object of the present invention is to provide a pressure-sensitive copying sheet which provides high color density without the tendency toward the formation of smudges.

A further object of the present invention is to provide a pressure-sensitive copying sheet which enables a number of copies to be made even by applying a low pressure with less tendency toward the formation of smudges.

As a result of extensive investigations to attain the above-described objects, a means completely different from conventionally known techniques has been discovered, thus achieving the present invention. That is, the objects of the present invention are attained with a pressure-sensitive recording sheet comprising a spport having thereon at least two color former-containing microcapsule layers with the mean particle size of the microcapsules in the second microcapsule layer being smaller than the mean particle size in the first microcapsule layer.

DETAILED DESCRIPTION OF THE INVENTION

In this specification, the term "first layer" designates the coating layer nearer to the surface of the support, and the term "second layer" designates the layer opposite to the support with respect to the first layer. Therefore, the most typical example comprises a configuration in which the first mirocapsule layer is coated on a support and the second microcapsule layer is coated on the first microcapsule layer. Also, in this specification, the microcapsules in each of the first and the second layers are not necessarily disposed as a single layer (i.e., a uniform film). That is, in each layer, microcapsules may be disposed in the form of piles of microcapsules or layers of microcapsules. Therefore, the boundary between the first and the second layers can be distinguished easily but it is not an abrupt boundary.

What is important in the present invention is that the microcapsule layer comprises two microcapsule layers and, in addition, that the microcapsules in each layer possesses the particle size relationship as described above. Therefore, the first microcapsule layer and the second microcapsule layer can be distinguished from each other by the size of microcapsules in each layer.

Any sheet in which the mean particle size of the microcapsules in the second layer is smaller than the mean particle size of the microcapsules in the first layer are included in the present invention, provided that the microcapsules in both microcapsule layers must contain a color former. However, sheets in which microcapsules in at least one microcapsule layer contains no color former are excluded from the scope of the present invention. Because, when microcapsules in the second microcapsule layer do not contain a color former, a pressure-sensitive recording sheet which is difficultly smudged when a pressure is applied thereto and which is easily colored when a low localized pressure is applied thereto cannot be obtained.

The microcapsules used in the first microcapsule layer and the second microcapsule layer can be easily produced according to processes already well known. That is, since the concentration of color former is easily determined upon production of microcapsules when the color former is dissolved in a solvent, there are no restrictions on the process for producing microcapsules used in the present invention. Microencapsulation can be effected using coacervation method (e.g., as described in U.S. Pat. Nos. 2,800,457; 2,800,458; 3,041,289; 3,687,865; etc.), an interfacial polymerization method (e.g., as described in U.S. Pat. Nos. 3,492,380; 3,577,515; British Pat. Nos. 950,433; 1,046,409; 1,091,141; etc.), an internal polymerization method (e.g., as described in British Pat. No. 1,237,498; French Pat. Nos. 2,060,818; 2,090,862; etc.), an external polymerization method (e.g., as described in British Pat. No. 989,264; Japanese Patent Publication Nos. 12380/62; 14327/62; 29483/70;

7313/71 30282/71; etc.), or the like.

The solvent for dissolving the color former is not particularly limited in the present invention, either. All solvents which have heretofore been used can be employed in this invention. Illustrative examples of solvents which are suitable include aromatic synthetic oils such as alkylated naphthalene, alkylated biphenyl, hydrogenated terphenyl, alkylated diphenylmethane (with each alkyl group having about 1 to 5 carbon atoms and with the number of the alkyl group substituents ranging from 1 to 4); petroleum fractions such as kerosene, naphtha, paraffin oil, etc.; aliphatic synthetic oils such as chlorinated paraffins, etc.; vegetable oils such as cotton seed oil, soybean oil, linseed oil, etc.; and mixtures thereof. The same or different solvents can be used in the microcapsules in the first and the second microcapsule layer. The concentration in each solution is not particularly limited, and those skilled in the art can easily produce microcapsules for each microcapsule layer of the present invention by reference to the concentration of color former solutions employed for conventional pressure-sensitive copying sheets (about 1 to 30%). The objects of the present invention can be attained more effectively by making the concentration of the color former contained in the microcapsules of the second microcapsule layer lower than the concentration of the color former contained in the microcapsules in the first microcapsule layer, (for example, less than about 50% that in the first layer).

The color former in the present invention is a colorless compound capable of forming a color when contacted with a solid acid and can also be defined as an electron donor colorless organic compound. As has already been described, the size of the color former-containing microcapsules is of importance in the present invention, and hence the kind and the property of the color former employed do not exert any substantial influences on the present invention. Therefore, any kind of color former can be used. For example, illustrative examples of color formers are triarylmethane compounds, diarylmethane compounds, xanthene compounds, thiazine compounds, spiropyran compounds, etc.

Specific examples of color formers which are suitable are illustrated below.

Examples of triphenylmethane compounds include 3,3-bis(p-dimethylaminophenyl)-6-dimethylaminophthalide, i.e., crystal violet lactone (hereinafter abbreviated as CVL), 3,3-bis-(p-dimethylaminophenyl)phthalide, 3-(p-dimethylaminophenyl)-3-(1,2-dimethylindol-3-yl)phthalide, 3-(p-dimethylaminophenyl)-3-(2-methylindol-3-yl)phthalide, 3-(p-dimethylaminophenyl)-3-(2-phenylindol-3-yl)phthalide, 3,3-bis-(1,2-dimethylindol-3-yl)-5-dimethylainophthalide, 3,3-bis-(1,2-dimethylindol -3-yl)-6-dimethylaminophthalide, 3,3-bis-(9-ethylcarbazol-3-yl)-5-dimethylaminophthalide, 3,3-bis-(2-phenylindol-3-yl)-5-dimethylaminophthalide, 3-p-dimethylaminophenyl-3-(1-methylpyrrol-2-yl)-6-dimethylaminophthalide, etc.

Illustrative diphenylmethane compounds are 4,4'-bis-dimethylaminobenzhydrin benzyl ether, N-halophenylleucoauramine, N-2,4,5-trichlorophenylleucoauramine, etc.

Examples of xanthene compounds are rhodamine-B-anilinolactam, rhodamine-(p-nitroanilino)lactam, rhodamine-B-(p-chloroanilino)lactam, 7-dimethylamino-2-methoxyfluoran, 7-diethylamino-2-methoxyfluoran, 7-diethylamino-3-chloro-2-methylfluoran, 7-diethylamino-3-(acetylmethylamino)fluoran, 7-diethylamino-3-(dibenzylamino)fluoran, 7-diethylamino-3-(methylbenzylamino)fluoran, 7-diethylamino-3-(chloroethylmethylamino)fluoran, 7-diethylamino-3-(diethylamino)fluoran, etc.

Suitable examples of thiazine compounds are benzoylleucomethylene blue, p-nitrobenzylleucomethylene blue, etc.

Spiro compounds include 3-methyl-spiro-dinaphthopyran, 3-ethyl-spiro-dinaphthopyran, 3,3'-dichloro-spiro-dinaphthopyran, 3-benzyl-spiro-dinaphthopyran, 3-methylnaphtho(3-methoxybenzo)-spiropyran, 3-propyl-spiro-dibenzodipyran, etc.

The above-illustrated color formers can be appropriately selected and be used alone or in combination.

The color formers used in the first microcapsule layer and the second microcapsule layer can be the same or different. From the viewpoint of the production of pressure-sensitive copying sheet, it is convenient to use the same color former and the same solvent in each layer. However, no special difference in the effects of the present invention are achieved in using the same color former and solvent and this choice is a matter of production convenience.

In preparing a pressure-sensitive recording sheet, a microcapsule coating solution is produced. The microcapsules are desirably of a mononuclear type. However, multi-nuclear type microcapsules can also be used and the objects of the present invention attained. The size of the microcapsules is usually about 1 to 500 μ, preferably about 2 to 50 μ. Microcapsules of about the same size can be used in the present invention. The size of microcapsules in the first microcapsule layer is not less than about 6 μ and the size of the microcapsules in the second microcapsule layer is not more than about 4 μ. In general, the ratio of the mean particle size in the first microcapsule layer is not less than about 1.5. A suitable mean particle size for the microcapsules in the first microcapsule layer can range from about 4 to 500 μ, preferably 6 to 25 μ, and for the microcapsules in the second microcapsule layer can range from about 1 to 10 μ, preferably 1 to 4 μ.

The microcapsule coating solution is usually prepared as a microcapsule dispersion, and hence the dispersion can be coated on a support as such. Also, the microcapsules can be coated, after or without the separating microcapsules from the microcapsule dispersion, by adding a binder such as a latex (e.g., a styrene-butadiene rubber latex, etc.), a water-soluble high polymer substance (e.g., starch, carboxymethyl cellulose, polyvinyl alcohol, gum arabic, casein, gelatin, etc.), or the like. Furthermore, a microcapsule-reinforcing agent such as a cellulose fine powder (as disclosed in U.S. Pat. No. 2,711,375), a polymer fine powder (as disclosed in U.S. Pat. No. 3,625,736), starch fine powder (as disclosed in British Pat. No. 1,232,347), color former-free microcapsules (as disclosed in British Pat. No. 1,235,991), etc., can be added to the microcapsule coating solution or the microcapsule layer. The microcapsule-reinforcing agent preferably is present not as a layer but dispersed throughout the microcapsule layer or scattered randomly on the surface of the microcapsule layer.

Suitable supports which can be used include a plastic film, a resin-coated paper, a synthetic paper, and the like. The microcapsule layer is coated at least on the surface of the support, on or under a developer layer (described hereinafter) or on the support surface opposite to the developer layer. Upon coating, the first microcapsule layer and the second microcapsule layer can be simultaneously coated as layers, or the second microcapsule layer can be coated after coating the first microcapsule layer. A suitable coating amount for the first microcapsule layer can range from about 1 to 15 $g/m^2$, preferably 2 to 10 $g/m^2$, of the support and for the second microcapsule layer can range from about 0.2 to 10 $g/m^2$, preferably 1 to 5 $g/m^2$, per $m^2$ of the support.

In this specification, the term "color developer" designates a solid acid and, more specifically, an electron accepting solid acid. Color developers are described in the aforesaid preceding patents. Illustrative specific examples include clays such as acid clay, active clay, attapulgite, etc.; organic acids such as aromatic carboxy compounds (e.g., salicylic acid, etc.), organic hydroxy compounds (e.g., p-t-butylphenol, p-t-amylphenol, o-chlorophenol, m-chlorophenol, p-chlorophenol, metal salt thereof (e.g., the zinc salt, etc.), etc.); a mixture of an organic acid and a metal compound (e.g., zinc oxide, etc.), acidic polymers such as phenol-formaldehyde resins, phenolacetylene resins, etc. Suitable color developers are described also in U.S. Pat. Nos. 3,501,331; 3,669,711; 3,427,180; 3,455,721; 3,516,845; 3,634,121; 3,672,935; 3,732,120; Japanese Patent Application Nos. 48545/70; 49339/70; 83651/70; 84539/70; 93245/70; 93246/70; 93247/70; 94874/70; 109872/70; 112038/70; 112039/70; 112040/70; 112753/70; 112754/70; 118978/70; 118979/70; 86950/71; etc.

The color developer is coated on a support together with a binder. A suitable coating amount of the color developer layer can range from about 1 to 15 $g/m^2$, preferably 2 to 10 $g/m^2$, of the support. Suitable supports include those described hereinbefore. Binders which can be suitably used are, e.g., latexes such as a styrene-butadiene rubber latex, a styrene-butadiene-acrylonitrile latex, a styrene-maleic anhydride copolymer latex, etc.; water-soluble natural high molecular weight compounds such as proteins (e.g., gelatin, gum arabic, albumin, casein, etc.), celluloses (e.g., carboxymethyl cellulose, hydroxyethyl cellulose, etc.), saccharoses (e.g., agar—agar, sodium alginate, starch, carboxymethyl starch, etc.), etc.; water-soluble synthetic high polymer compounds such as polyvinyl alcohol, polyvinyl pyrrolidone, polyacrylic acid, polyacrylamide, etc.; organic solvent-soluble high molecular weight compounds such as nitrocellulose, ethyl cellulose, polyesters, polyvinyl acetate, polyvinylidene chloride, vinyl chloride-vinylidene chloride copolymers, etc. These binders can be used also as a binder for the microcapsule dispersion. Conventional additives heretofore known can be included in the color developer layer.

The pressure-sensitive copying paper of the present invention provides greater color density as compared with conventional pressure-sensitive copying papers and enables a number of copies to be made due to structure in which the microcapsule layer comprises two layers with the mean particle size of the microcapsules in the upper microcapsule layer being smaller than the mean particle size of the microcapsules in the lower microcapsule layer.

These effects must be said to be truly surprising in view of the additional advantage that no fog is formed before use. In particular, it should be noted that these advantages are not lost even when a low pressure is applied. Furthermore, as another advantage, the pressure-sensitive copying sheet of the present invention possesses an excellent surface property. As is apparent from the above description, there is the advantage that, even when a microcapsule-reinforcing agent is used, the amount thereof can be smaller in comparison with conventional pressure-sensitive copying papers The present invention is illustrated in greater detail by reference to the following non-limiting example of a preferred embodiment of the present invention. Additionally, in the example, all parts and percents are by weight unless otherwise indicated.

The process for producing a color developer paper and method for testing the same were conducted as follows.

Production of Color Developer Paper 1.5 parts of a 50% sodium hydroxide aqueous solution was added to 80 parts of water and, after dispersing therein 40 parts of acid clay, 8 parts of a styrene-butadiene rubber latex was added thereto to prepare a coating solution. This coating solution was coated on a 40 $g/m^2$ paper in an amount of 8 $g/m^2$.

Testing Method

1. Pressure Resistance

The microcapsule layer of a microcapsule-coated paper was faced toward the color developer layer and a pressure of 40 $kg/cm^2$ was applied to the assembly for 30 seconds to measure the color density of the color developer layer.

2. Friction Resistance

The microcapsule layer and the color developer layer were faced toward each other and the color developer layer was rotated at a rotation rate of 30 rpm and at a linear velocity of 1 m/min while applying a pressure of 200 $g/cm^2$ to measure the color density of the color developer layer.

3. Coloring Property

The microcapsule layer and the color developer layer were faced toward each other and a pressure of 150 $kg/cm^2$ or 300 $kg/cm^2$ was applied thereto to measure the color density of the color developer layer.

4. Color Density the colored marks were measured using a densitometer and the results were represented in terms of visual density (V.D.).

EXAMPLE

Preparation of Microcapsule Solution

A. 6 parts of acid-processed gelatin having an isoelectric point of 8.2 and 4 parts of gum arabic were dissolved in 40 parts of warm water at 40°C, and 0.2 part of Turkey red oil was added as an emulsifier (colloid solution). Then, 45 parts of a diisopropylnaphthalene containing dissolved therein 3.0% by weight of crystal violet lactone and 2.5% by weight of benzoyl leucomethylene blue (color former oil) was added to the above-described colloid solution under vigorous stirring for emulsification to form an o/w type emulsion. The stirring was discontinued when the size of oil droplets became 12 ~ 16 $\mu$. 185 parts of warm water at 40°C was added. A 20% aqueous solution of hydrochloric acid was added dropwise thereto, while continuing the stirring, to adjust the pH to 4.4. The colloid wall accumulated around the oil droplets was gelled and solidified by externally cooling the vessel while continuing the stirring. 1.5 parts of a 37% formaldehyde aqueous solution was added under stirring when the liquid temperature reached 10°C.

Further, 20 parts of an aqueous solution (7% by weight) of the sodium salt of carboxymethyl cellulose (etherification degree: 0.75 on a number basis) was added thereto. Then, a 10% by weight sodium hydroxide aqueous solution was added dropwise thereto until the pH of the system reached 10, and the temperature of the system was increased by externally heating the vessel and maintained for 1 hour at 40°C to obtain a color former-containing Microcapsule Solution A.

B. Microcapsule Solution B was prepared in the same manner as in Microcapsule Solution A except for changing the size of oil droplets from 12 ~ 16 $\mu$ to 6 ~ 8 $\mu$.

C. Microcapsule Solution C was prepared in the same manner as Microcapsule Solution A except for changing the size of oil droplets from 12 ~ 16 $\mu$ to 2 ~ 4 $\mu$.

D. Microcapsule Solution D was prepared in the same manner as Microcapsule Solution A except for changing the size of oil droplets from 12 ~ 16 $\mu$ to 1 ~ 2 $\mu$.

E. Microcapsule Solution E was prepared in the same manner as Microcapsule Solution A except for changing the concentration of the CVL from 3.0% by weight to 1.5% by weight, the concentration of benzoyl leucomethylene blue from 2.5% by weight to 1.25% by weight, and the size of oil droplets from 12 ~ 16 $\mu$ to 4 ~ 6 $\mu$.

Composition of Microcapsule Coating Solution

| | parts |
|---|---|
| Coating Solution A: | |
| Microcapsule Solution A | 100 |
| 10% Aqueous Solution of Oxidized Starch | 25 |
| Cellulose Fiber (mean length: 200 $\mu$; mean width: 30 $\mu$) | 2 |
| Arrowroot Starch (mean particle size: 40 $\mu$) | 2 |
| Coating Solution B: | |
| Microcapsule Solution B | 100 |
| 10% Aqueous Solution of Oxidized Starch | 15 |
| Wheat Starch (particle size: 15 ~ 20 $\mu$) | 3 |
| Coating Solution C: | |
| Microcapsule Solution C | 100 |
| 10% Aqueous Solution of Oxidized Starch | 10 |
| Wheat Starch (particle size: 15 ~ 20 $\mu$) | 3 |
| Coating Solution D: | |
| Microcapsule Solution D | 100 |
| 10% Aqueous Solution of Oxidized Starch | 10 |
| Wheat Starch (particle size: 15 ~ 20 $\mu$) | 3 |
| Coating Solution E: | |
| Microcapsule Solution E | 100 |
| 10% Aqueous Solution of Oxidized Starch | 10 |
| Wheat Starch (particle size: 15 ~ 20 $\mu$) | 3 |

Preparation of Microcapsule-Coated Paper

1. Microcapsule Solution A was coated on a 50 g/m$^2$ paper in an amount of 4.5 g/m$^2$ using an air-knife coating method and dried to obtain Coated Paper 1.

2. Microcapsule Coating Solution A was coated on a 50 g/m$^2$ paper in an amount of 5.0 g/m$^2$ using an air-knife coating method and dried to obtain Coated Paper 2.

3. Microcapsule Coating Solution A was coated on a 50 g/m$^2$ paper in an amount of 4.0 g/m$^2$ using an air-knife coating method and dried. Then, Microcapsule Coating Solution B was coated thereon in an amount of 0.5 g/m$^2$ using an air-knife coating method and dried to obtain Coated Paper 3.

Similarly, Coated Papers 4 ~ 11 were prepared according to the following table.

| Coated Paper | First Layer Coating Solution | First Layer Amount Coated (g/m$^2$) | Second Layer Coating Solution | Second Layer Amount Coated (g/m$^2$) |
|---|---|---|---|---|
| 4 | Microcapsule Solution A | 4.25 | Microcapsule Coating Solution C | 0.75 |
| 5 | " | " | " D | " |
| 6 | " | 4.5 | " E | " |
| 7 | Microcapsule Coating Solution A | " | " B | " |
| 8 | " | " | " C | " |
| 9 | " | " | " D | " |
| 10 | " | " | " E | " |
| 11 | Microcapsule Solution A | 4.5 | Microcapsule Solution D | " |

| | Coloring Property (V.D.) 150 kg/cm$^2$ | Coloring Property (V.D.) 300 kg/cm$^2$ | Pressure Resistance (V.D.) | Friction Resistance (V.D.) |
|---|---|---|---|---|
| 1 (Comparison) | 0.68 | 0.81 | 0.28 | 0.42 |
| 2 (Comparison) | 0.66 | 0.78 | 0.15 | 0.22 |
| 3 | 0.69 | 0.84 | 0.12 | 0.16 |
| 4 | 0.68 | 0.83 | 0.08 | 0.13 |
| 5 | 0.68 | 0.80 | 0.07 | 0.09 |
| 6 | 0.69 | 0.82 | 0.06 | 0.08 |
| 7 | 0.68 | 0.80 | 0.10 | 0.15 |
| 8 | 0.67 | 0.79 | 0.05 | 0.13 |
| 9 | 0.66 | 0.79 | 0.06 | 0.08 |
| 10 | 0.65 | 0.79 | 0.05 | 0.07 |
| 11 | 0.68 | 0.82 | 0.17 | 0.24 |

As is clear from the results tabulated above, it can be seen that examples in accordance with the present invention (Examples 3 to 11) are pressure-sensitive copying sheets having excellent manufacturing property as compared with the comparative examples.

While the invention has been described in detail and with reference to specific embodiments thereof, it will be apparent to one skilled in the art that various changes and modifications can be made therein without departing from the spirit and scope thereof.

What is claimed is:

1. A pressure-sensitive recording sheet which comprises a support having thereon a color former-containing microcapsule coating, said color former being an electron donor colorless organic compound capable of forming a color when contacted with a solid acid, said microcapsule coating comprising at least two microcapsule layers with the mean particle size of the microcapsules in the microcapsule layer closest to the support being larger than the mean particle size of the microcapsules in the microcapsule layer farther away from the support wherein the ratio of the mean particle size of the microcapsules in the microcapsule layer closest to the support to the mean particle size of the microcapsules in the microcapsule layer farther away from the support is at least above about 1.5.

2. The pressure-sensitive recording sheet of claim 1, wherein the mean particle size of the microcapsules in the microcapsule layer closest to the support ranges from about 4 to 500 $\mu$ and the mean particle size of the microcapsules in the microcapsule layer farther away from the support ranges from about 1 to 10 $\mu$.

3. The pressure-sensitive recording sheet of claim 1, wherein the microcapsules in the microcapsule layer closest to the support are coated in an amount of about 1 to 15 g per $m^2$ of the support and the microcapsules in the microcapsule layer farther away from the support are coated in an amount of about 0.2 to 10 g per $m^2$ of the support.

4. The pressure-sensitive recording sheet of claim 1, wherein the microcapsules contain said color former in a solvent selected from the group consisting of an aromatic synthetic oil, a petroleum fraction, an aliphatic synthetic oil, a vegetable oil, or a mixture thereof and wherein said color former is a triphenylmethane compound, a diphenylmethane compound, a xanthene compound, a thiazine compound, or a spiro compound.

5. The pressure-sensitive recording sheet of claim 1, wherein said microcapsule coating comprises two layers.

6. The pressure-sensitive recording sheet of claim 1, wherein at least one of said microcapsule layers contains a particulate or fibrous microcapsule-reinforcing agent.

7. The pressure-sensitive recording sheet of claim 1, wherein said color former is selected from the group consisting of a triarylmethane compound, a diarylmethane compound, a xanthene compound, a thiazine compound, a spiropyran compound and a combination thereof.

* * * * *